US011169954B2

(12) United States Patent
Carapelli et al.

(10) Patent No.: US 11,169,954 B2
(45) Date of Patent: Nov. 9, 2021

(54) SYSTEM AND METHOD FOR CONTROLLING SECURE CONTENT AND NON-SECURE CONTENT AT A FUEL DISPENSER OR OTHER RETAIL DEVICE

(75) Inventors: Giovanni Carapelli, Florence (IT); Paolo Filippini, Florence (IT); Michael E. Williams, Raleigh, NC (US)

(73) Assignee: GILBARCO INC., Greensboro, NC (US)

( * ) Notice: Subject to any disclaimer, the term of this patent is extended or adjusted under 35 U.S.C. 154(b) by 1187 days.

(21) Appl. No.: 12/287,688

(22) Filed: Oct. 10, 2008

(65) Prior Publication Data

US 2009/0265638 A1 Oct. 22, 2009

Related U.S. Application Data

(60) Provisional application No. 60/978,938, filed on Oct. 10, 2007.

(51) Int. Cl.
*G06Q 20/00* (2012.01)
*G06F 15/173* (2006.01)
(Continued)

(52) U.S. Cl.
CPC ....... *G06F 15/173* (2013.01); *G06Q 20/3821* (2013.01); *G07F 9/023* (2013.01)

(58) Field of Classification Search
CPC ........... G06Q 2220/00; G06Q 2220/10; G06Q 2220/16
(Continued)

(56) References Cited

U.S. PATENT DOCUMENTS 5,493,613 A 2/1996 Denno et al.
5,933,816 A 8/1999 Zeanah et al.
(Continued)

FOREIGN PATENT DOCUMENTS

CA 2078020 A1 3/1994
EP 0546782 A1 6/1993
(Continued)

OTHER PUBLICATIONS

International Search Report and Written Opinion dated Dec. 19, 2008, corresponding PCT Application No. PCT/US2008/011651, International Filing Date Oct. 10, 2008.
(Continued)

*Primary Examiner* — Dante Ravetti
(74) *Attorney, Agent, or Firm* — Nelson Mullins Riley & Scarborough LLP

(57) ABSTRACT

A retail payment, advertising, and content switching system and method are disclosed. According to one embodiment, a secure content source or a non-secure content source is allowed to drive a customer user interface, respectively, without compromising security requirements. The content may be video, audio, prompts, or any other type of content. A secure controller is provided to control one or more user input devices and a user interface access module to control whether a secure source or a non-secure source drives the user interface, depending on the security mode of the system. The secure controller, the user interface access module, and the customer input devices are provided in an anti-tampering module. The secure controller prevents the non-secure source from providing unauthorized prompts on the customer user interface to "fake out" the customer so that sensitive customer information is not passed "in the clear."

16 Claims, 9 Drawing Sheets

(51) Int. Cl.
*G06Q 20/38* (2012.01)
*G07F 9/02* (2006.01)

(58) Field of Classification Search
USPC .................... 705/64, 16, 21, 59, 71; 380/44
See application file for complete search history.

(56) References Cited

U.S. PATENT DOCUMENTS

| | | | |
|---|---|---|---|
| 5,949,411 A | | 9/1999 | Doerr et al. |
| 6,006,332 A | * | 12/1999 | Rabne ................ G06F 21/10 |
| | | | 705/51 |
| 6,011,537 A | | 1/2000 | Slotznick |
| 6,084,583 A | | 7/2000 | Gerszberg et al. |
| 6,128,842 A | * | 10/2000 | Lotspeich ............... G07F 9/02 |
| | | | 312/234.5 |
| 6,152,591 A | * | 11/2000 | McCall ................ B67D 7/106 |
| | | | 235/380 |
| 6,195,694 B1 | * | 2/2001 | Chen et al. .................. 709/220 |
| 6,298,446 B1 | * | 10/2001 | Schreiber ............ G06F 17/211 |
| | | | 726/27 |
| 6,326,934 B1 | * | 12/2001 | Kinzie ................... B67D 7/04 |
| | | | 340/10.1 |
| 6,360,138 B1 | * | 3/2002 | Coppola .............. G06Q 20/341 |
| | | | 700/231 |
| 6,405,317 B1 | | 6/2002 | Flenley et al. |
| 6,442,448 B1 | * | 8/2002 | Finley et al. ................ 700/231 |
| 6,601,039 B1 | | 7/2003 | Kolls |
| 6,630,941 B1 | | 10/2003 | Addison |
| 6,882,729 B2 | | 4/2005 | Arling et al. |
| 7,519,653 B1 | * | 4/2009 | Coutts et al. ............... 709/203 |
| 8,009,032 B2 | | 8/2011 | Long et al. |
| 2001/0029528 A1 | * | 10/2001 | Coutts et al. ............... 709/219 |
| 2002/0038289 A1 | * | 3/2002 | Lawlor et al. ............... 705/42 |
| 2002/0099658 A1 | * | 7/2002 | Nielsen et al. .............. 705/43 |
| 2002/0139842 A1 | * | 10/2002 | Swaine ....................... 235/379 |
| 2002/0147684 A1 | * | 10/2002 | Kirkhope et al. ........... 705/43 |
| 2002/0156704 A1 | * | 10/2002 | Kolls ........................... 705/27 |
| 2002/0156835 A1 | | 10/2002 | Williams et al. |
| 2003/0040959 A1 | * | 2/2003 | Fei et al. ...................... 705/14 |
| 2003/0171832 A1 | | 9/2003 | Knepper |
| 2003/0212595 A1 | * | 11/2003 | Antonucci ................... 705/14 |
| 2004/0098740 A1 | | 5/2004 | Maritzen et al. |
| 2005/0211766 A1 | | 9/2005 | Robertson et al. |
| 2006/0016884 A1 | | 1/2006 | Block et al. |
| 2006/0179323 A1 | | 8/2006 | Nei |
| 2006/0232592 A1 | * | 10/2006 | Faso ..................... G06F 21/567 |
| | | | 345/530 |
| 2007/0033398 A1 | | 2/2007 | Robertson et al. |
| 2007/0143208 A1 | * | 6/2007 | Varga .............................. 705/43 |
| 2007/0145120 A1 | * | 6/2007 | Webb ..................... G06Q 40/02 |
| | | | 235/380 |
| 2007/0185818 A1 | * | 8/2007 | Nozawa ......................... 705/51 |
| 2011/0199308 A1 | | 8/2011 | Nativel et al. |
| 2012/0059694 A1 | | 3/2012 | Kuebert et al. |
| 2012/0180140 A1 | | 7/2012 | Barrowman et al. |

FOREIGN PATENT DOCUMENTS

| | | |
|---|---|---|
| EP | 1253537 A2 | 10/2002 |
| EP | 1460593 A1 | 9/2004 |
| EP | 1788507 A2 | 5/2007 |
| GB | 2319102 A | 5/1998 |
| JP | 08324697 A | 12/1996 |
| JP | 10236595 A | 9/1998 |
| JP | 2003026298 A | 1/2003 |
| WO | 1997027141 A1 | 7/1997 |
| WO | 9819278 A2 | 5/1998 |
| WO | 1998040826 A2 | 9/1998 |
| WO | 2006034713 A2 | 4/2006 |

OTHER PUBLICATIONS

Extended European Search Report dated Sep. 25, 2013, for corresponding EPO Application No. 08837438.4.
Examination Report dated Mar. 16, 2017 in corresponding European patent application No. 08837438.4, all enclosed pages cited.
Examination Report dated Apr. 30, 2019 in corresponding European patent application serial No. 08837438.4, all enclosed pages cited.

* cited by examiner

SYSTEM AND METHOD FOR CONTROLLING SECURE CONTENT AND NON-SECURE CONTENT AT A FUEL DISPENSER OR OTHER RETAIL DEVICE

PRIORITY CLAIM

This application claims the benefit of provisional application Ser. No. 60/978,938, filed Oct. 10, 2007, which is hereby relied upon and incorporated herein by reference.

FIELD OF THE INVENTION

The present invention relates to a system and method for controlling secure prompting at a fuel dispenser or other retail device, such as during purchase transactions, so that secure and non-secure content from third parties can be presented at the retail device when purchase transactions are not being performed.

BACKGROUND OF THE INVENTION

A conventional payment terminal, such as a payment terminal on a fuel dispenser, provides users with prompts, information, and additional content. This content may include audio. The payment terminal typically requires a user to complete several steps during a purchase transaction sequence. Prompts and audio that are related to payment are typically secure since sensitive payment information transfer is required. Prompts for other information need not be secure. For example, steps that are payment specific, such as credit/debit card number acquisition, personal identification number (PIN) data entry, and payment application selection, are secure. In contrast, steps related to the product and/or service selection (e.g., fuel grade, car wash, etc.) or generic advertisements (e.g., an "offer of the day") need not be secure.

Retailers have evolving business needs and typically want to enhance the customer experience by providing a rich mix of content, especially advertising related to loyalty programs and other types of advertising. In some cases, it may be easier or desired for the retailer to allow third parties to connect to the payment terminal to provide this additional content. However, by allowing third parties to provide content to a payment terminal, the risk of fraud at the payment terminal increases. For example, a perpetrator of fraud may provide a "fake" prompt or audio request on the payment terminal for a user to enter a PIN or other private information. If this information is not protected at the payment terminal, the perpetrator may acquire the private information.

SUMMARY OF THE INVENTION

The present invention recognizes and addresses the foregoing considerations and others of prior art constructions and methods.

In accordance with one aspect, the present invention provides a retail payment, advertising, and content switching system and method that controls whether a secure content source or a non-secure content source is allowed to drive a user interface without compromising security requirements. The content may be video, audio, prompts, or any other type of output that can be provided to an interface. A secure controller is provided to control one or more user input devices. The secure controller also controls a user interface access switch to control whether a secure source or a non-secure source drives a user interface output device, depending on the security mode of the system. The switch may be physical or logical. The non-secure source may be provided by a third party vendor that is not the retailer or the manufacturer of the retail device. The secure controller, the user interface access switch, and the customer input devices are preferably provided in an anti-tampering module.

The secure controller enters into the secure mode if the secure controller will request sensitive information from the customer or when a customer provides unsolicited input into a user input device, such as a card swipe or keypad press, for example. The secure controller enables the user input device to encrypt data received from the user in the secure mode. The secure controller also switches the user interface access switch to the secure source to ensure that only the secure source can provide information on the output device in the secure mode. This prevents the non-secure source from providing unauthorized prompts on the output device to "fake out" the user by asking for sensitive information, such as PIN or other payment account information, when the system is in the non-secure mode and the input device would otherwise pass received information unencrypted or "in the clear." Sensitive customer information passed "in the clear" could be "skimmed" by an eavesdropper if the secure controller did not enter into the secure mode, since the input devices do not encrypt user input when in the non-secure mode.

If the non-secure source desires to prompt and receive customer input, the non-secure source can send a request message to the secure controller. If the secure controller is already in the secure mode, a wait message is issued to the non-secure source until the secure controller has completed any secure activities. If the secure controller is not already in the secure mode, the secure controller switches the user interface access switch away from the non-secure source. In either case, the secure controller goes into secure mode. The secure controller determines if the requested prompt is authorized using a verification process. If authorized, the secure controller, not the non-secure source, controls driving the output device in the secure mode with an authorized prompt for receiving the desired customer input. Optionally, the secure controller enables the customer input device to encrypt the received customer information. For example, a response to a loyalty program request for mileage or kilometers traveled may not be encrypted, whereas a response to a non-bank related customer authentication request may be encrypted. The secure controller enables the customer input device to encrypt the received customer information again to prevent an eavesdropper from taking control of the non-secure source to elicit sensitive information passed "in the clear" and subject to "skimming."

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
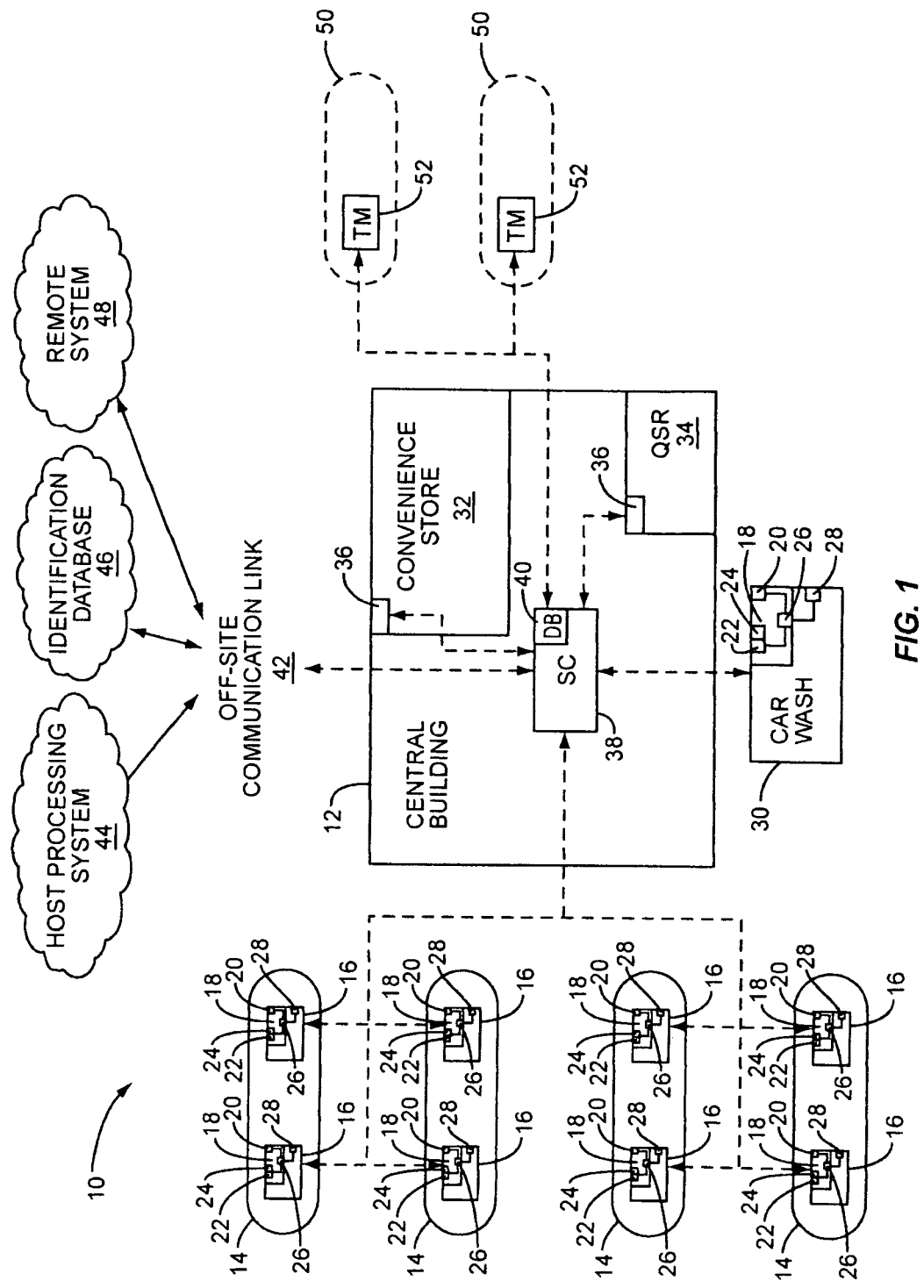
FIG. 1 is a schematic diagram of an exemplary retail fueling environment in accordance with an embodiment of the present invention which functions to control secure prompting at a retail device by preventing non-secure content from being presented to a customer such as when purchase transactions are being performed.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Embodiments of the present invention provide a retail payment, advertising, and content switching system and method that controls whether a secure content source or a non-secure content source is allowed to drive a customer (user) interface without compromising security requirements. The content may be video, audio, prompts, or any other type of output that can be provided to an interface via one or more output devices. A secure controller is provided to control one or more user input devices. The secure controller also controls a user interface access switch to control whether a secure source or a non-secure source drives a user output device, depending on the security mode of the system. The switch may be physical or logical. The non-secure source may be provided by a third party vendor that is not the retailer or manufacturer of the dispenser (or other retail device). The secure controller, the user interface access switch, and the customer input devices are preferably provided in an anti-tampering module.

The secure controller enters into the secure mode if the secure controller will request sensitive information from the user or when a user provides unsolicited input into a user input device, such as a card swipe or keypad press, for example. The secure controller enables the user input device to encrypt data received from the customer in the secure mode. The secure controller also switches the user interface access switch to the secure source to ensure that only the secure source can provide information on the user output device in the secure mode. This prevents the non-secure source from providing unauthorized prompts on the user output device to "fake out" the customer by asking for sensitive information, such as PIN or other payment account information, when the system is in the non-secure mode and the user input device would otherwise pass received information unencrypted or "in the clear." Sensitive customer information passed "in the clear" could be "skimmed" by an eavesdropper if the secure controller did not enter into the secure mode, since the user input devices typically do not encrypt customer input when in the non-secure mode.

If the non-secure source desires to prompt and receive user input, the non-secure source can send a request message to the secure controller. If the secure controller is already in the secure mode, a wait message is issued to the non-secure source until the secure controller has completed any secure activities. If the secure controller is not already in the secure mode, the secure controller switches the user interface access switch away from the non-secure source. In either case, the secure controller goes into secure mode. The secure controller determines if the requested prompt is authorized using a verification process. If authorized, the secure controller, not the non-secure source, controls driving the user output device in the secure mode with an authorized prompt for receiving the desired user input. Optionally, the secure controller enables the user input device to encrypt the received customer information. For example, a response to a loyalty program request for mileage or kilometers traveled may not be encrypted, whereas a response to a non-bank related customer authentication request may be encrypted. The secure controller enables the user input device to encrypt the received customer information again to prevent an eavesdropper from taking control of the non-secure source to elicit sensitive information passed "in the clear" and subject to "skimming."

FIG. 1 is a schematic diagram of an exemplary retail fueling environment 10 in accordance with the present invention to control secure prompting at a retail device (such as a fuel dispenser) by preventing non-secure content from being presented to a customer when purchase transactions are being performed. The retail fueling environment 10 includes a central building 12 and a plurality of fueling islands 14, each including multiple fuel dispensers 16. Each fuel dispenser 16 includes an anti-tampering module 18 that provides a secure environment within which to perform payment transactions at each fuel dispenser 16. Each anti-tampering module 18 includes a secure controller 20 providing secure content to the customer, such as secure prompting when purchase transactions are being performed. The anti-tampering module 18 may include a display 22, a speaker 24, and a user interface access switch 26. The user interface access switch 26 may be either physical or logical. Content switched by the user interface access switch 26 may be video, audio, prompts, or any other type of output that can be provided to an interface. Each fuel dispenser 16 also includes a non-secure controller 28 that provides non-secure content, such as advertisements and associated information, to either the display 22 or the speaker 24 when purchase transactions are not being performed. It should be noted that while the speaker 24 represents an output device used to prompt a customer within a retail environment, the speaker 24 may also be an intercom that provides two-way communication capabilities without departure from the scope of the subject matter described herein.

The user interface access switch 26 is controlled by the secure controller 20 to selectively route prompts from either the secure controller 20 when a purchase transaction is currently in process or from the non-secure controller 28 when a purchase transaction is not currently in process. As will be described in more detail below, the user interface access switch 26 within the anti-tampering module 18 provides a platform upon which non-secure content may be modified and presented to customers within the retail fueling environment 10 without extensive maintenance or upgrade of equipment within the fuel dispensers 16. It should be noted that the user interface access switch 26 may include a multi-source switch capable of allowing multiple non-secure controllers 28 to drive the display without departure from the scope of the subject matter described herein.

In this embodiment, the retail fueling environment 10 includes a car wash 30. As can be seen from FIG. 1, the car wash 30 also includes the anti-tampering module 18, the secure controller 20 for controlling secure prompting when purchase transactions are being performed, the display 22, the speaker 24, the user interface access switch 26, and the non-secure controller 28. Accordingly, prompts at the car wash 30 may be controlled to provide secure prompts during payment transactions and to allow advertising and associated information during times when payment transactions are not being performed.

The central building 12 need not be centrally located within the retail fueling environment 10, but rather is the focus of the retail fueling environment 10, and may house a convenience store 32 and/or a quick serve restaurant (QSR) 34 therein. Both the convenience store 32 and the QSR 34 may include a point-of-sale (POS) device 36 for authorizing payment transactions and associated activities within the retail fueling environment 10.

The central building 12 further includes a site controller (SC) 38, which in an exemplary embodiment may be the G-SITE® sold by Gilbarco Inc. of Greensboro, N.C., or another third party site controller. The site controller 38 may control the authorization of fueling transactions and other conventional activities, as is well understood. The site controller 38 may be incorporated into a POS device, such as the POS device 36, if needed or desired, such that the site controller 38 also acts as a POS device.

The site controller 38 includes a database (DB) 40 capable of storing identification and authorization indicia. This identification and authorization indicia may be used to identify an individual issuing a request at the POS device 36 within the retail fueling environment 10. This identification of the individual may include use of biometric information or other data. The identification and authorization indicia may also be used to authenticate the request from that individual by use of passwords or other information, such as an employee identification number or fingerprint, that may be entered at the POS device 36 during a request sequence.

Further, the site controller 38 may have an off-site communication link 42 allowing communication with a remote location for credit/debit card authorization via a host processing system 44, an identification database 46, and/or a remote system 48. The identification database 46 can be used to remotely store the information described above in association with the DB 40. The remote system 48 represents another computer, system, or device that can be used to access identification information, such as credit card and/or fingerprint data. The off-site communication link 42 may be routed through the Public Switched Telephone Network (PSTN), the Internet, both, or the like, as needed or desired.

It should be noted that the car wash 30, the convenience store 32, and the QSR 34 are all optional and need not be present in a given retail fueling environment.

As described above, the plurality of fueling islands 14 may have one or more fuel dispensers 16 positioned thereon. The fuel dispensers 16 and the POS devices 36 are in electronic communication with one another and with the site controller 38 through a Local Area Network (LAN), pump communication loop, or other communication channel or line, or the like.

The retail fueling environment 10 also has one or more underground storage tanks (USTs) 50 adapted to hold fuel therein. As such, the USTs 50 may be double-walled USTs. Further, each UST 50 may include a liquid level sensor or other sensor (not shown) positioned therein. The sensors may report to a tank monitor (TM) 52 associated therewith. The TM 52 may communicate with the fuel dispensers 16 (either through the site controller 38 or directly, as needed or desired) to determine amounts of fuel dispensed, and compare fuel dispensed to current levels of fuel within the USTs 50 to determine if the USTs 50 are leaking. In a typical installation, the tank monitor 52 is also positioned in the central building 12, and may be proximate to the site controller 38. The tank monitor 52 may communicate with the site controller 38 for leak detection reporting, inventory reporting, or the like.

Figure 2:
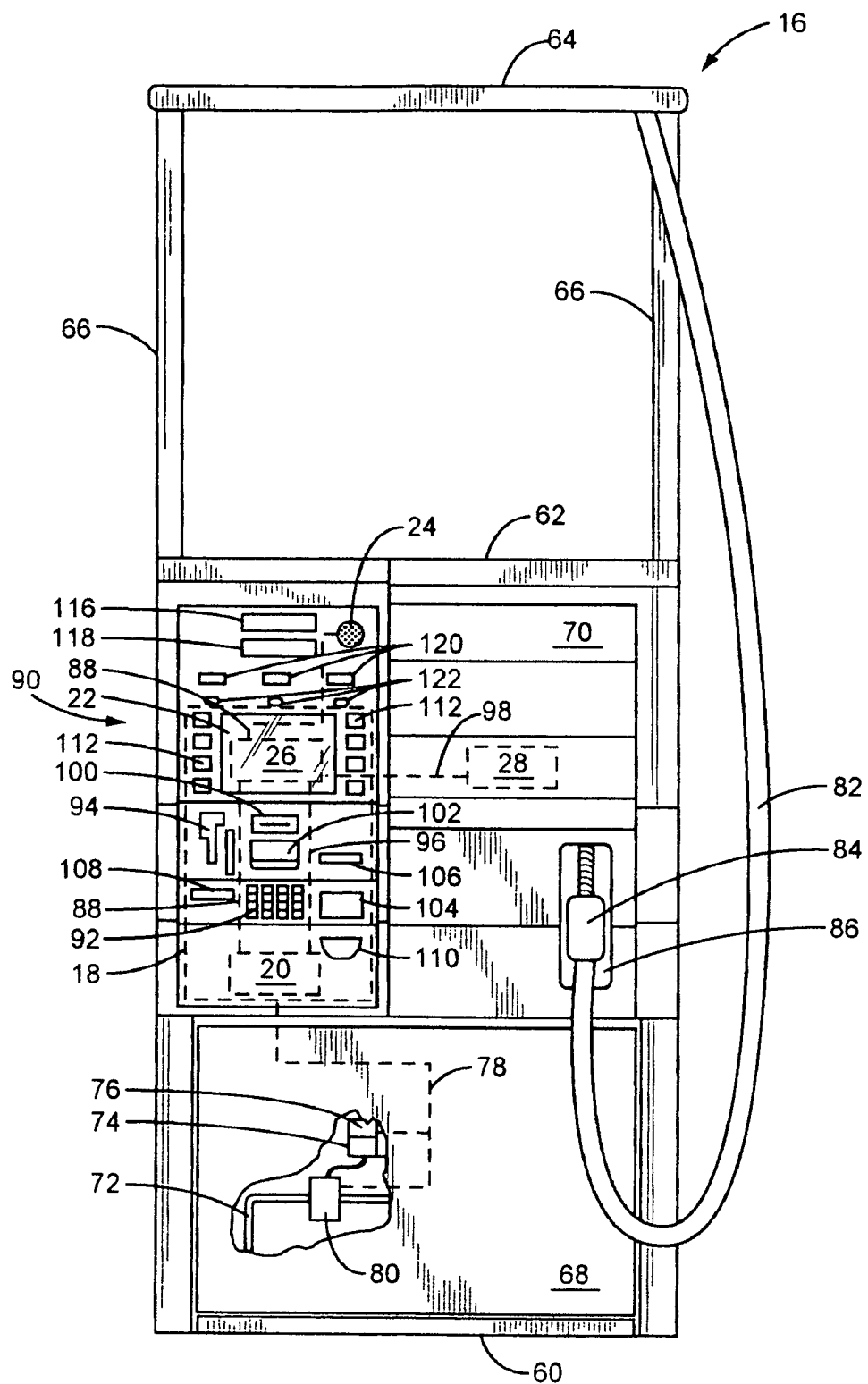
FIG. 2 illustrates a detailed view of an exemplary fuel dispenser including a user interface access switch controlled by a secure controller for preventing a non-secure source from accessing a user interface output device during purchase transactions according to an embodiment of the subject matter described herein.

FIG. 2 illustrates a detailed view of an exemplary fuel dispenser 16 including the user interface access switch 26 controlled by the secure controller 20 for preventing the non-secure controller 28 from accessing a user interface output device, such as the display 22 or the speaker 24, during payment transactions. It should be noted that the user interface access switch 26 within the embodiment of FIG. 2 is illustrated as a physical switching device. However, as described above, the user interface access switch 26 may be a logical switch such as implemented by software (including firmware) without departure from the scope of the subject matter described herein. Thus, the term "switch" is intended to convey the function to be performed rather than necessarily referring to a discrete switch device. Similarly, the various "controllers" and other components described herein may be implemented in hardware or software (including firmware) as necessary or appropriate. As will be described in more detail below, the secure controller 20 detects initiation of payment transactions at the fuel dispenser 16 and controls the user interface access switch 26 such that only the secure controller 20 drives the display 22 and the speaker 24 during the payment transactions.

The fuel dispenser 16 has a base 60 and a top 62, with a canopy 64 supported by two side panels 66. The fuel dispenser 16 is subdivided into multiple compartments. A hydraulic area 68 is used to enclose hydraulic components and an electronic area 70 is used to enclose electronic components. A vapor barrier (not shown) may be used to separate the hydraulic area 68 from the electronic area 70.

Several components used to control fuel flow may be housed within the hydraulic area 68. Fuel from USTs 50 (FIG. 1) is pumped through a piping network into inlet or fuel dispensing pipes. An inlet pipe 72 provides a piping network from the one or more USTs 50.

When fuel is dispensed, fuel begins to travel through a meter 74, which is responsive to flow rate or volume. A pulser 76 is employed to generate a signal in response to fuel movement through the meter 74. Control/data lines 78 provide a signaling path from the pulser 76 to the secure controller 20. The control/data lines 78 provide signals to the secure controller 20 indicative of the flow rate or volume of fuel being dispensed within the meter 74. The control/data lines 78 may provide control signaling to a valve 80 that may be opened and closed to dispense and terminate dispensing of fuel, respectively.

As can be seen from FIG. 2, the secure controller 20 is housed within the anti-tampering module 18. As such, the secure controller 20 is less susceptible to tampering than if it were located outside of the anti-tampering module 18. The secure controller 20 includes circuitry (not shown) for controlling access to the display 22 and the speaker 24, as will be described in more detail below. The secure controller 20 also controls transaction-level and functional processing within the fuel dispenser 16 by collecting meter flow measurements from the pulser 76, performing calibration operations associated with the meter 74, and performing calculations such as cost associated with a fuel dispensing transaction.

As fuel is dispensed from the fuel dispenser 16, the secure controller 20 receives signaling from the pulser 76 associated with the meter 74 described above during the dispensing transaction. In response to receipt of signaling from the pulser 76, the secure controller 20 provides transaction-level functionality within the fuel dispenser 16. The secure controller 20 collects, either directly or indirectly, meter flow measurements associated with the meter 74.

As a dispensing transaction progresses, fuel is then delivered to a hose 82 and through a nozzle 84 into the customer's vehicle (not shown). The fuel dispenser 16 includes a nozzle boot 86, which may be used to hold and retain the nozzle 84 when not in use. The nozzle boot 86 may include a mechanical or electronic switch (not shown) to indicate when the nozzle 84 has been removed for a fuel dispensing request and when the nozzle 84 has been replaced, signifying the end of a fueling transaction. A control line (not shown) provides a signaling path from the boot's electronic switch to the secure controller 20. The secure controller 20 uses signaling received via the control line in order to make a determination as to when a fueling transaction has been initiated or completed.

The secure controller 20 uses control/data lines 88 to interface to a user interface 90 which includes the display 22, the speaker 24, and various combinations of subsystems to facilitate customer interaction with the fuel dispenser 16. The secure controller 20 drives data to the display 22 and the speaker 24 using the control/data lines 88, as will be described in more detail below. The user interface 90 may include a keypad 92. The keypad 92 may be used for selection of different types of purchase transactions available to the customer or to enter an authentication code. The keypad 92 may also be used for entry of a PIN if the customer is using a debit card for payment of fuel or other goods and/or services.

The user interface 90 may also contain a magnetic strip card reader 94 for insertion of credit, debit or other magnetic strip cards for payment. Additionally, the magnetic strip card reader 94 may accept loyalty or program-specific cards that entitle the customer to a fixed credit, percentage discount, or other favorable pricing on fuel or other goods and/or services.

Signaling from the keypad 92, the magnetic strip card reader 94, or another user input device associated with the user interface 90 may be used by the secure controller 20 to determine when a payment transaction has been initiated to control the user interface access switch 26. The display 22 and the speaker 24 are used to provide information, such as transaction-related prompts and advertising, to the customer. As such, the secure controller 20 controls access to the display 22 and the speaker 24 via user interface control lines 96 to select the mode of operation of the user interface access switch 26. The user interface access switch 26 operates in one of two modes or states of operation: a secure mode and a non-secure mode.

When a transaction is initiated, the secure controller 20 selects the mode of operation of the user interface access switch 26 to ensure that it is in a secure mode, which disables access to the display 22 from the non-secure controller 28 by disabling control/data lines 98 that are used by the non-secure controller 28 to drive display data to the display 22. When a transaction is completed, the secure controller 20 may either transition the operating mode of the user interface access switch 26 to the non-secure mode at that time or may do so when a request for the display of non-secure content is received from the non-secure controller 28. The details of the control interface associated with the user interface access switch 26 will be described in more detail below beginning with FIG. 3.

The user interface 90 may also include other payment or transactional devices to receive payment information for transaction processing associated with transactions, including a bill acceptor 100, an optical reader 102, a smart card reader 104, and a biometric reader 106. The user interface 90 also includes a receipt printer 108 so that a receipt with a recording of the transaction carried out at the fuel dispenser 16 may be generated and presented to the customer. A change delivery device 110 may also be used to deliver change for overpayment to a customer. Soft keys 112 are used by the customer to respond to information requests presented to the user via the display 22. As described above, the speaker 24 is provided to generate audible cues for the customer and to allow the customer to interact with an operator or attendant.

In addition, the fuel dispenser 16 includes a transaction price total display 116 that may be used to present the price to be charged to the customer for fuel that is dispensed. A transaction gallon total display 118 may be used to present the customer with the measurement of fuel dispensed in units of gallons or liters as a volume of fuel dispensed from the fuel dispenser 16. Octane selection buttons 120 are provided for the customer to select which grade of fuel is to be dispensed before dispensing is initiated. Price per unit (PPU) displays 122 are provided to show the price per unit of fuel dispensed in either gallons or liters, depending upon the programming of the fuel dispenser 16.

Figure 3:
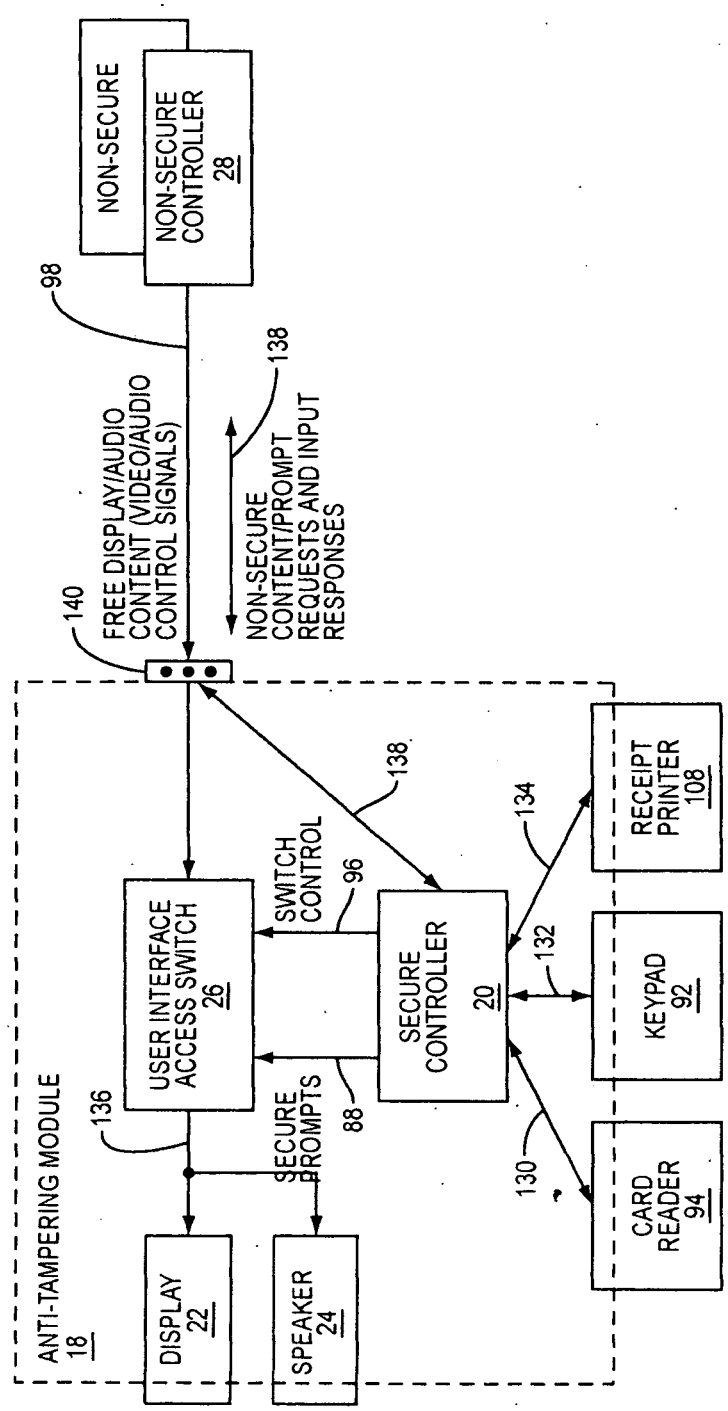
FIG. 3 illustrates a block diagram of an exemplary content switching system for controlling secure prompting at a retail device, such as during purchase transactions, so that secure and non-secure content from third parties can be presented at the retail device when purchase transactions are not being performed, according to an embodiment of the subject matter described herein.

FIG. 3 illustrates a block diagram of an exemplary switching system embodiment for controlling secure prompting at a retail device, such as during purchase transactions, so that secure and non-secure content from third parties can be presented at the retail device when purchase transactions are not being performed. In particular, the components described within FIG. 2 for controlling the content presented on either the display 22 or the speaker 24 are illustrated in more detail. As can be seen from FIG. 3, the anti-tampering module 18 protects input devices, such as the card reader 94 and the keypad 92, and output devices, such as the display 22, the speaker 24, and the receipt printer 108, from tampering. Electrical control signals for these input and output devices may be accessed only from within the anti-tampering module 18. Accordingly, a would-be hacker will not have direct access to any control or data signals associated with these input and output devices.

The secure controller 20 interfaces with the card reader 94, the keypad 92, and the receipt printer 108 via control/data lines 130, 132, and 134, respectively. The secure controller 20 also controls the user interface access switch 26 via the user interface control lines 96 to selectively control whether one or more non-secure controllers 28 may drive the display 22 and the speaker 24. As described above, any secure prompts may be provided to the display 22 and the speaker 24 from the secure controller 20 via the control/data lines 88. Control and data signals for the display 22 and the speaker 24 are passed from the user interface access switch 26 via control/data lines 136. Alternatively, should a non-secure controller 28 desire to provide a prompt to a user on the display 22, that non-secure controller 28 may initiate non-secure content/prompt requests and input responses to the secure controller 20 via a non-secure control system interface 138. When such a request is made, the secure controller 20 may provide a requested prompt via the control/data lines 88, the user interface access switch 26, and the control/data lines 136 to the display 22 and the speaker 24.

When the secure controller 20 is not in a secure mode, for example, when a transaction is not being processed and when the non-secure controller 28 has not requested a prompt from the user, the secure controller 20 may switch the state of the user interface access switch 26 via user interface control lines 96 to allow one of the non-secure controllers 28 to drive content over control/data lines 98 to the display 22 and the speaker 24.

FIG. 3 also illustrates an external interface connector 140. The external interface connector 140 provides physical connectivity for one or more non-secure controllers 28 from outside the anti-tampering module 18. As such, one or more non-secure controllers 28 may be connected to the anti-tampering module 18 via the external interface connector 140.

Figure 4:
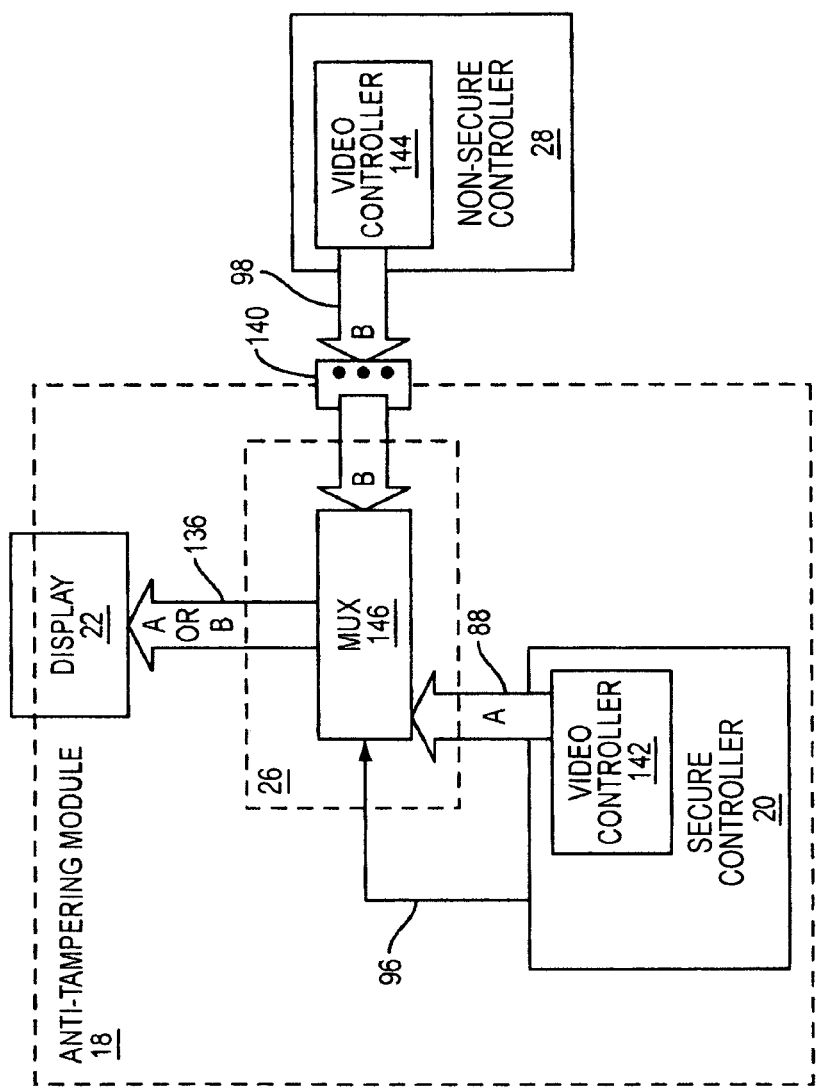
FIG. 4 illustrates an exemplary embodiment of a user interface access switch according to an embodiment of the subject matter described herein.

FIG. 4 illustrates an exemplary embodiment of the user interface access switch 26. As described above, the user interface access switch 26 allows the secure controller 20 to control whether the secure controller 20 or the non-secure controller 28 drives the display 22 and the speaker 24. For ease of illustration, the speaker 24 is not illustrated within FIG. 4. However, it should be noted that control of audio content may be provided without departure from the scope of the subject matter described herein.

The user interface access switch 26 operates in one of two modes or states of operation: the secure mode and the non-secure mode, as selected by the secure controller 20. The anti-tampering module 18 is again illustrated with the external interface connector 140 by which the non-secure controller 28 connects to the anti-tampering module 18. The secure controller 20 and the non-secure controller 28 are illustrated to each include a video controller 142 and 144, respectively. By providing the video controller 142 and the video controller 144 within the respective control systems, the user interface access switch 26 may be implemented without a separate video controller. As such, the user interface access switch 26 may be implemented, for example, as a multiplexer (MUX) 146 within the present embodiment. As can be seen from FIG. 4, the output of the MUX 146 that is passed to the display 22 over the control/data lines 136 is selected based upon the state of the user interface control lines 96 to pass video display data and control signals from either the secure controller 20 or the non-secure controller 28 to the display 22. As described above, though not depicted within FIG. 4, audio controllers may be used in addition to the video controller 142 and the video controller 144 within the respective control systems to control audio for a speaker, such as the speaker 24.

This embodiment, which provides the video controller 144 within the non-secure controller 28, allows for improvements to the video controller 144 to be deployed as technology permits and without extensive regulatory and approval requirements. For example, as improvements to the video controller 144 are realized, enhanced user interface and graphic programs, such as customer loyalty programs, may be deployed without requiring an update to the video controller 144.

Figure 5:
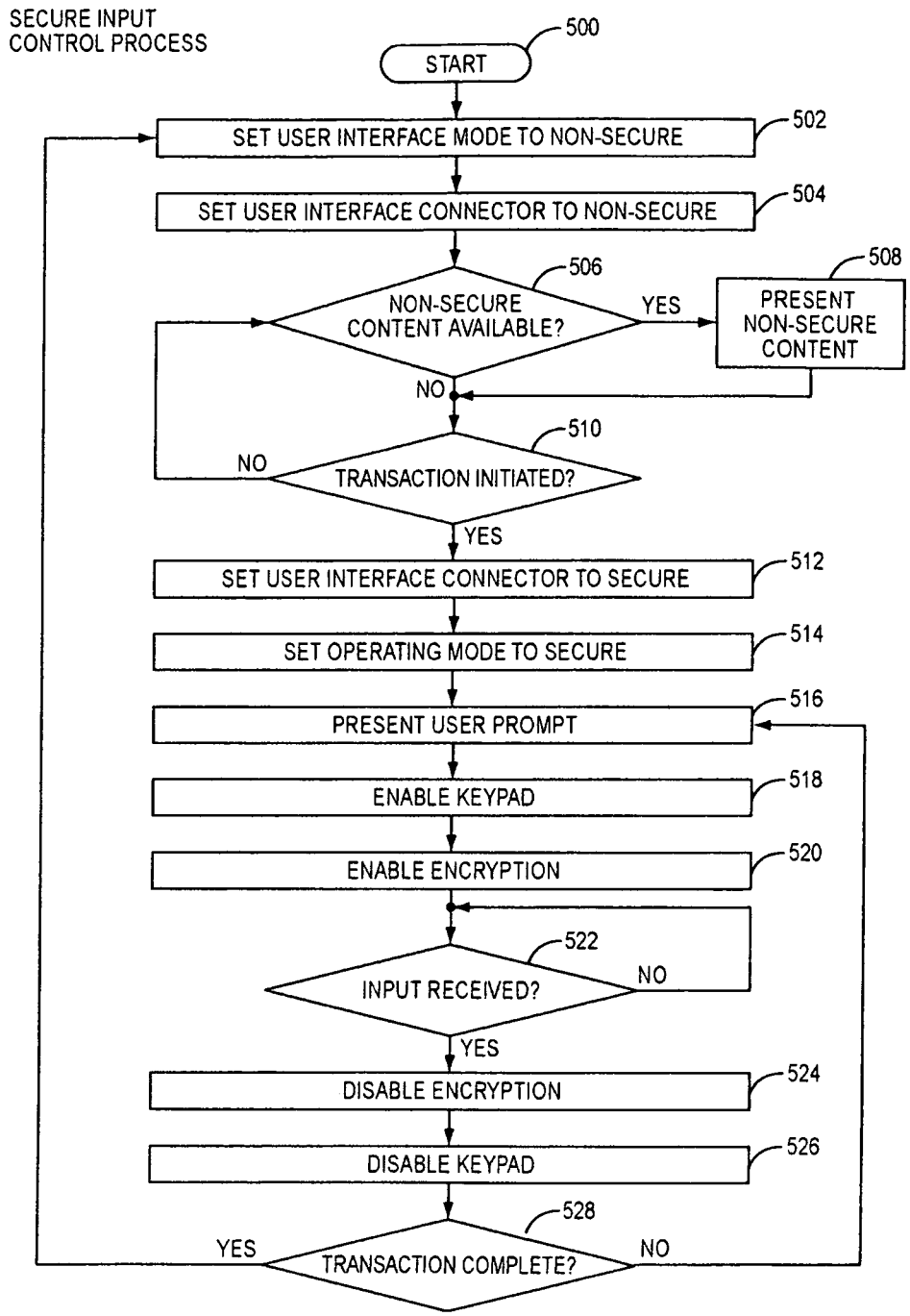
FIG. 5 illustrates an exemplary secure input control process that may be executed on a switching system for transaction processing and control of a user interface access switch to allow the switching system to prompt for and receive secure input during transaction processing and to allow a non-secure source to provide content to a display and an audio output device, such as a speaker, when a transaction is not in process according to an embodiment of the subject matter described herein.

With two exemplary control system embodiments provided, FIG. 5 now illustrates an exemplary secure input control process that may be executed on the secure controller 20 for transaction processing and control of the user interface access switch 26 to allow the secure controller 20 to prompt for and receive secure input during transaction processing and to allow the non-secure controller 28 to provide content to the display 22 and the speaker 24 when a transaction is not in process. The process begins (step 500) and sets an operating mode to non-secure (step 502). The operating mode may be a flag, variable, state, or any other indicator representative of the current operating mode. The process then sets the user interface connector, such as the user interface access switch 26, to non-secure (step 504).

The process then makes a determination as to whether non-secure content is available or ready for presentation to the user (decision point 506). As described above, the non-secure content may be either video content or audio content, presented, for example, via the display 22 or the speaker 24, respectively. If non-secure content is available, the process presents the non-secure content to the user (step 508). When there is no non-secure content available or ready for presentation to the user, or when non-secure content has been presented, the process makes a determination as to whether a transaction has been initiated (decision point 510). If a transaction has not been initiated, the process returns to determine whether any non-secure content is available or ready for presentation to the user (decision point 506) and iteratively processes any available non-secure content until a transaction has been initiated.

When a transaction has been initiated, the process sets the user interface connector, such as the user interface access switch 26, to secure (step 512). The process then sets the operating mode to secure (step 514) and presents an appropriate user prompt (step 516). As described above, the user prompt which is presented may be either a video prompt or an audio prompt, presented, for example, via the display 22 or the speaker 24, respectively. The process enables the keypad, such as the keypad 92, to allow entry of user information, such as a PIN (step 518) and enables encryption (step 520) of the user information. The process then waits for input to be received from the user (decision point 522). When input has been received from the user, the process disables encryption for the keypad 92 (step 524) and disables the keypad 92 (step 526).

The process then makes a determination as to whether the transaction is complete (decision point 528). If the transaction is not yet complete, the process iteratively presents user prompts and receives encrypted user input as described above (beginning with step 516). When a determination is made that the transaction is complete, the process returns to set the operating mode to a non-secure mode (step 502). The process may then continue to present non-secure content and to perform transaction-based secure processing as described above.

Figure 6:
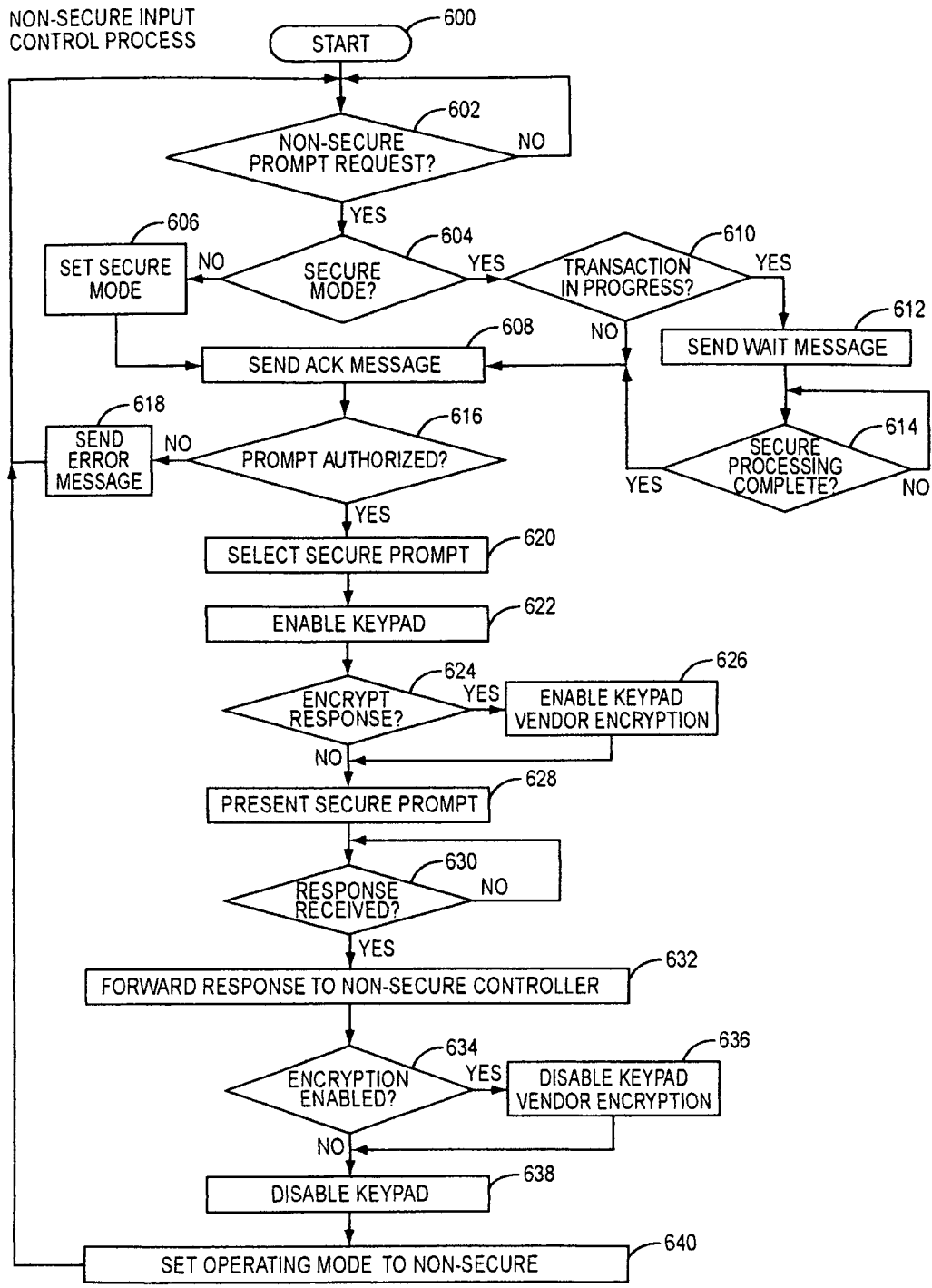
FIG. 6 illustrates an exemplary non-secure input control process that may be used to allow a non-secure source to request the switching system to present a prompt for a user according to an embodiment of the subject matter described herein.

FIG. 6 illustrates a non-secure input control process that may be used to allow a non-secure controller, such as the non-secure controller 28, to request a secure controller, such as the secure controller 20, to present a prompt for the user. As described above, the prompt may be either a video prompt or an audio prompt, presented, for example, by the display 22 or the speaker 24, respectively. The process begins (step 600) and waits for a non-secure prompt request (decision point 602).

When a non-secure prompt request has been received, the process determines whether the current operating mode is a secure mode (decision point 604). If a determination is made that the current operating mode is not a secure mode, the process sets the operating mode to the secure mode (step 606). The process then sends an acknowledgement message back to the requesting source (step 608).

When a determination is made that the current operating mode is a secure mode, the process makes a determination of whether a transaction is currently in progress (decision point 610). When a determination is made that a transaction is in progress, the process sends a wait message to the requesting source (step 612) and waits for any secure processing to be completed (decision point 614). When there is no transaction in progress or when secure processing has been completed, the process also sends an acknowledgement message back to the requesting source (step 608), as described above.

After sending an acknowledgement message to the requesting source, the process determines whether the prompt is authorized (decision point 616). If the prompt is not authorized, the process sends an error message to the requesting source (step 618) and returns to await a new non-secure prompt request (decision point 602). When a determination is made that the prompt is authorized, the process selects an appropriate secure prompt (step 620) and enables the keypad, such as the keypad 92, for user input (step 622).

As described above, vendor-specific encryption may be used to encrypt user information other than transaction-based information. Accordingly, the process makes a determination of whether to encrypt a response associated with the secure prompt to be displayed (decision point 624). If a determination is made to encrypt the response, the keypad 92 is enabled for vendor-specific encryption (step 626). In response to a determination not to encrypt the response or after vendor-specific encryption has been enabled, the process presents the secure prompt (step 628) and waits for a response to be received (decision point 630).

When a response has been received, the process forwards the response to the non-secure controller (step 632), such as the non-secure controller 28, and makes a determination of whether encryption was previously enabled (decision point 634). If encryption was previously enabled, vendor-specific encryption of the keypad 92 is disabled (step 636). When a determination is made that encryption was not previously enabled or after the vendor-specific encryption has been disabled, the process disables the keypad 92 (step 638) and sets the operating mode to non-secure (step 640). The process then returns to await a new non-secure prompt request (decision point 602).

Figure 7:
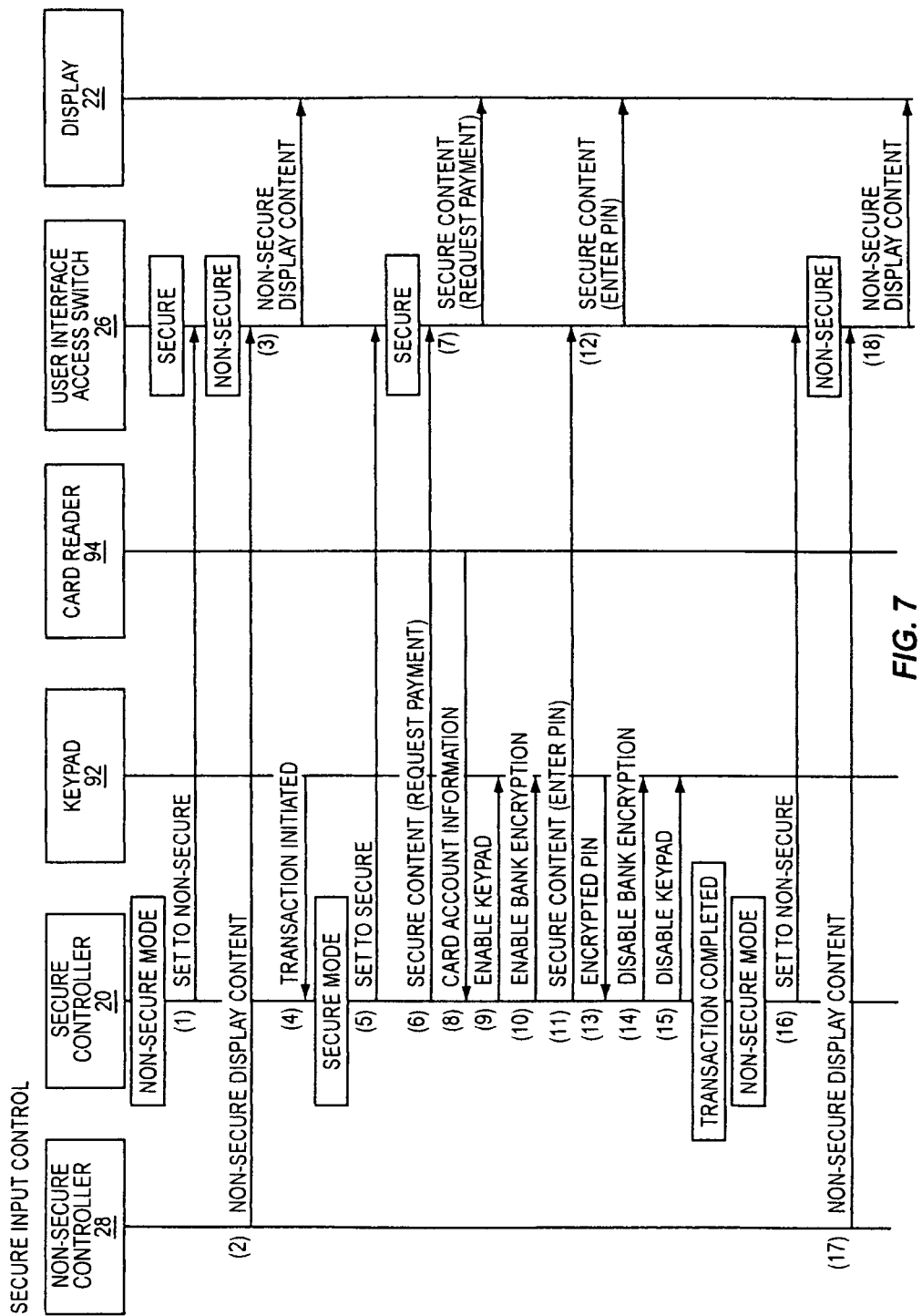
FIG. 7 illustrates an exemplary message flow diagram for secure input control according to an embodiment of the subject matter described herein.

FIG. 7 illustrates an exemplary message flow diagram for secure input control. As with FIG. 5 described above, the message flow diagram of FIG. 7 provides for control of a user interface access switch, such as the user interface access switch 26, to selectively enable and disable access to a user interface output device, such as the display 22 and the speaker 24, by a non-secure controller, such as the non-secure controller 28. For ease of illustration purposes, the speaker 24 is not depicted within FIG. 7. As such, FIG. 7 focuses on signaling associated with display content. However, it should be noted that, as with other embodiments described herein, control of audio content may be provided without departure from the scope of the subject matter described herein.

By controlling the user interface access switch 26 via control signaling or messaging, the secure controller 20 ensures that the user interface access switch 26 prohibits the non-secure controller 28 from driving content to the display 22 when a transaction is in process. A transaction initiated by a user, such as via the keypad 92 or the card reader 94, will signal the secure controller 20 to transition to the secure mode and to signal the user interface access switch 26 to transition control of user interface output devices, such as the display 22 and the speaker 24, to the secure controller 20. The non-secure controller 28 may be allowed to provide content to the display 22 and the speaker 24 at times other than during a transaction.

The exemplary message flow of FIG. 7 begins with the secure controller 20 setting the operating mode to non-secure and sending a message to the user interface access switch 26 to set the user interface access switch 26 to a non-secure input mode (line 1). In response to the message, the user interface access switch 26 transitions from the secure mode to the non-secure mode. As described above, in the non-secure mode, the non-secure controller 28 may drive display and audio content for presentation to the user.

The non-secure controller 28 then provides non-secure display content to the user interface access switch 26 (line 2) and the user interface access switch 26 forwards the non-secure display content to the display 22 (line 3). The non-secure controller 28 may continue to provide non-secure display content for display to the user on the display 22 via the user interface access switch 26 until a transaction is initiated.

Within the exemplary embodiment of FIG. 7, it would be assumed that a transition is initiated by a key press on the keypad 92 by the user, such as a "pay at the pump" key press. Once a transaction is initiated from the keypad 92 (line 4), the secure controller 20 sets its operating mode to the secure mode. The secure controller 20 also sends a message to the user interface access switch 26 to set its mode to secure (line 5) and in response, the user interface access switch 26 sets its mode to secure. The secure controller 20 then forwards secure content, such as, for example, a payment request prompt, to the user interface access switch 26 (line 6). The user interface access switch 26 forwards the secure content including the payment request prompt to the display 22 (line 7).

In response to the secure prompt payment request, the card reader 94 receives account information and forwards that information to the secure controller 20 (line 8). The secure controller 20 then enables the keypad 92 for numeric data entry by forwarding an enable message to the keypad 92 (line 9) and sends an enable bank encryption message to the keypad 92 (line 10).

The secure controller 20 then forwards the secure content, such as a prompt directing the user to enter a PIN, to the user interface access switch 26 (line 11). As described above, while only the display 22 is illustrated within FIG. 7, the prompt may be either a video prompt or an audio prompt, presented via the display 22 or the speaker 24, respectively. The user interface access switch 26 forwards the secure content including the PIN request to the display 22 (line 12). In response to the PIN request prompt, the keypad 92 receives a PIN code from the user and encrypts it with the bank encryption algorithm and forwards the encrypted PIN to the secure controller 20 (line 13). After the encrypted PIN is received, the secure controller 20 forwards a disable bank encryption message to the keypad 92 (line 14) and a disable keypad message (line 15) to terminate numeric data entry on the keypad 92.

The exemplary embodiment within FIG. 7 illustrates that the transaction is then completed. Upon completion of the transaction, the secure controller 20 sets the operating mode to the non-secure mode and sends a message to the user interface access switch 26 to set its mode to the non-secure mode (line 16) and in response, the user interface access switch 26 sets its mode to non-secure.

With the user interface access switch 26 set back to the non-secure mode, the non-secure controller 28 then sends new non-secure display content to the user interface access switch 26 (line 17) and the user interface access switch 26 forwards the non-secure display content to the display 22 for presentation to the user (line 18).

Figure 8:
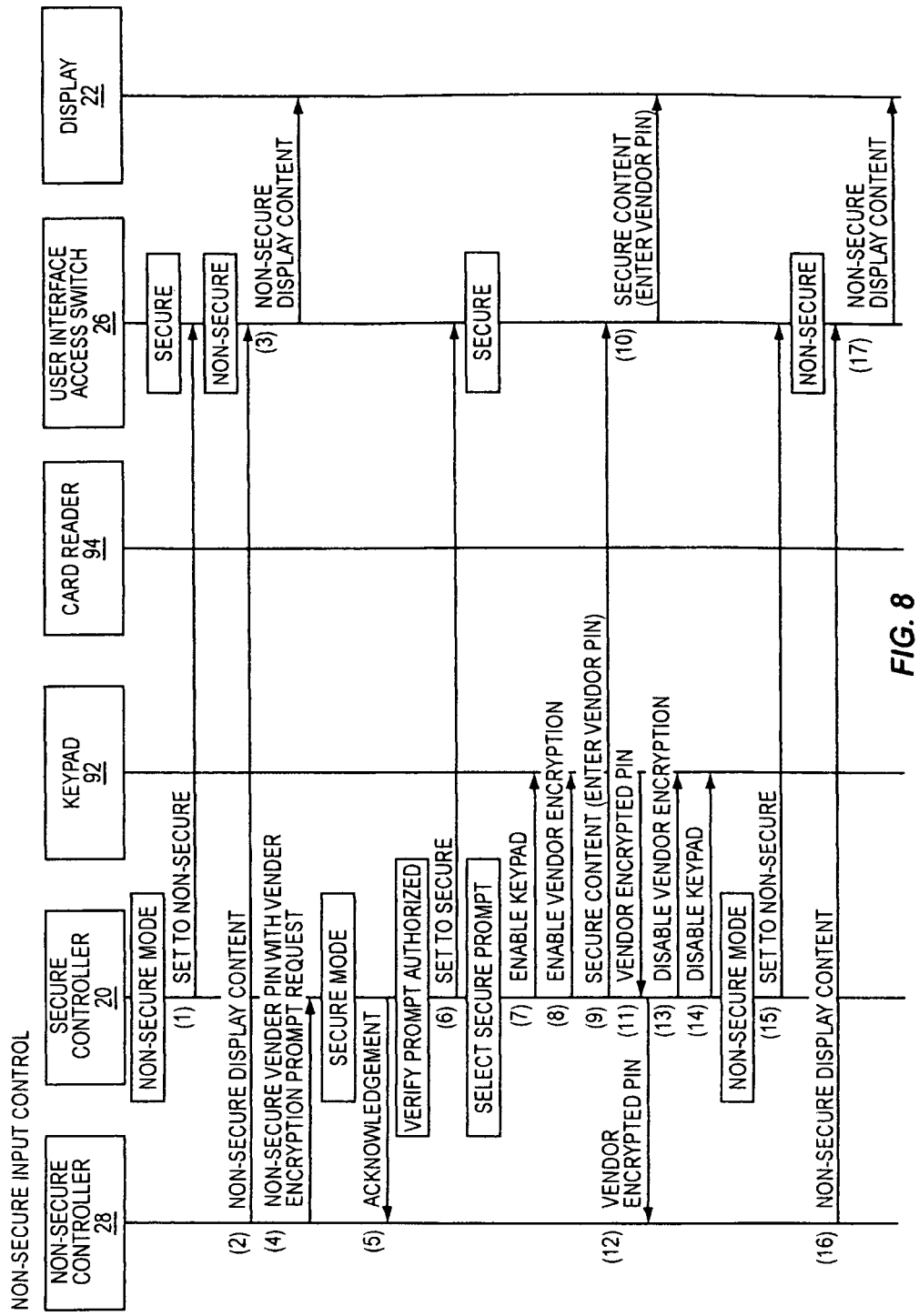
FIG. 8 illustrates an exemplary non-secure input control message flow diagram representative of exemplary messaging that may be used when a non-secure source wishes to present a prompt to a user according to an embodiment of the subject matter described herein.

FIG. 8 illustrates an exemplary non-secure input control message flow diagram representative of exemplary messaging that may be used when a non-secure controller, such as the non-secure controller 28, wishes to present a prompt to a user. As with FIG. 7 above, for ease of illustration purposes, the speaker 24 is not depicted within FIG. 8. As such, FIG. 8 focuses on signaling associated with display content. However, it should be noted that, as with other embodiments described, control of audio content may be provided without departure from the scope of the subject matter described herein.

By controlling the user interface access switch 26 via control signaling or messaging, the secure controller 20 ensures that the user interface access switch 26 prohibits the non-secure controller 28 from driving content to the display 22 when the non-secure controller 28 desires input from a user. The non-secure controller 28 may request that the secure controller 20 present a prompt to the user on behalf of the non-secure controller 28. The secure controller 20 may authorize any prompt to be presented prior to presenting the prompt to the user on either the display 22 or the speaker 24 and may receive a response from the user and forward that response to the non-secure controller 28. As such, the secure controller 20 controls all input requests presented to the user.

The exemplary message flow of FIG. 8 begins with the secure controller 20 setting the operating mode to non-secure and sending a message to the user interface access switch 26 to set the user interface access switch 26 to a non-secure input mode (line 1). In response to the message, the user interface access switch 26 transitions from the secure mode to the non-secure mode. As described above, in the non-secure mode, the non-secure controller 28 may drive display and audio content for presentation to the user.

The non-secure controller 28 then provides non-secure display content to the user interface access switch 26 (line 2) and the user interface access switch 26 forwards the non-secure display content to the display 22 (line 3). The non-secure controller 28 may continue to provide non-secure display content for display to the user on the display 22 via the user interface access switch 26 until a transaction is initiated, as described above in association with FIG. 7.

The non-secure controller 28 then sends a "non-secure vendor PIN with vendor encryption" prompt request to the secure controller 20 (line 4). In response, the secure controller 20 changes its operating mode to the secure mode and issues an acknowledgement to the non-secure controller 28 (line 5). The secure controller 20 then verifies that the requested prompt is an authorized prompt for the requesting source. If the prompt is an authorized prompt, the secure controller 20 sends a message to the user interface access switch 26 to set its operating mode to secure (line 6). The user interface access switch 26 then sets its operating mode to secure to disable access to the display 22 by the non-secure controller 28.

The secure controller 20 also selects an appropriate secure prompt to send to the display 22. The secure controller 20 then sends an enable keypad message (line 7) and an enable vendor encryption message (line 8) to the keypad 92. The secure controller 20 sends the secure content, such as a request to enter a vendor PIN prompt message, to the user interface access switch 26 (line 9). The user interface access switch 26 forwards the secure content prompt to the display 22 to request that the user enter the vendor PIN (line 10).

In response to entry of a vendor PIN by the user, the keypad 92 encrypts the received PIN and forwards the vendor-encrypted PIN to the secure controller 20 (line 11). The secure controller 20 forwards the vendor-encrypted PIN to the non-secure controller 28 for processing (line 12). The secure controller 20 sends a disable vendor encryption message (line 13) and a disable keypad message (line 14) to the keypad 92. The secure controller 20 sets its operating mode back to the non-secure mode and sends a message to the user interface access switch 26 to set the operating mode of the user interface access switch 26 to the non-secure mode (line 15). In response to receipt of the message from the secure controller 20, the user interface access switch 26 sets its operating mode to the non-secure mode.

With the user interface access switch 26 back in the non-secure mode, the non-secure controller 28 sends non-secure display content to the user interface access switch 26 (line 16) and the user interface access switch 26 forwards that non-secure display content to the display 22 (line 17) for presentation to the user. As described above, while only the display 22 is illustrated within FIG. 8, the content presented to the user may be either a video content or an audio content, presented via the display 22 or the speaker 24, respectively.

Figure 9:
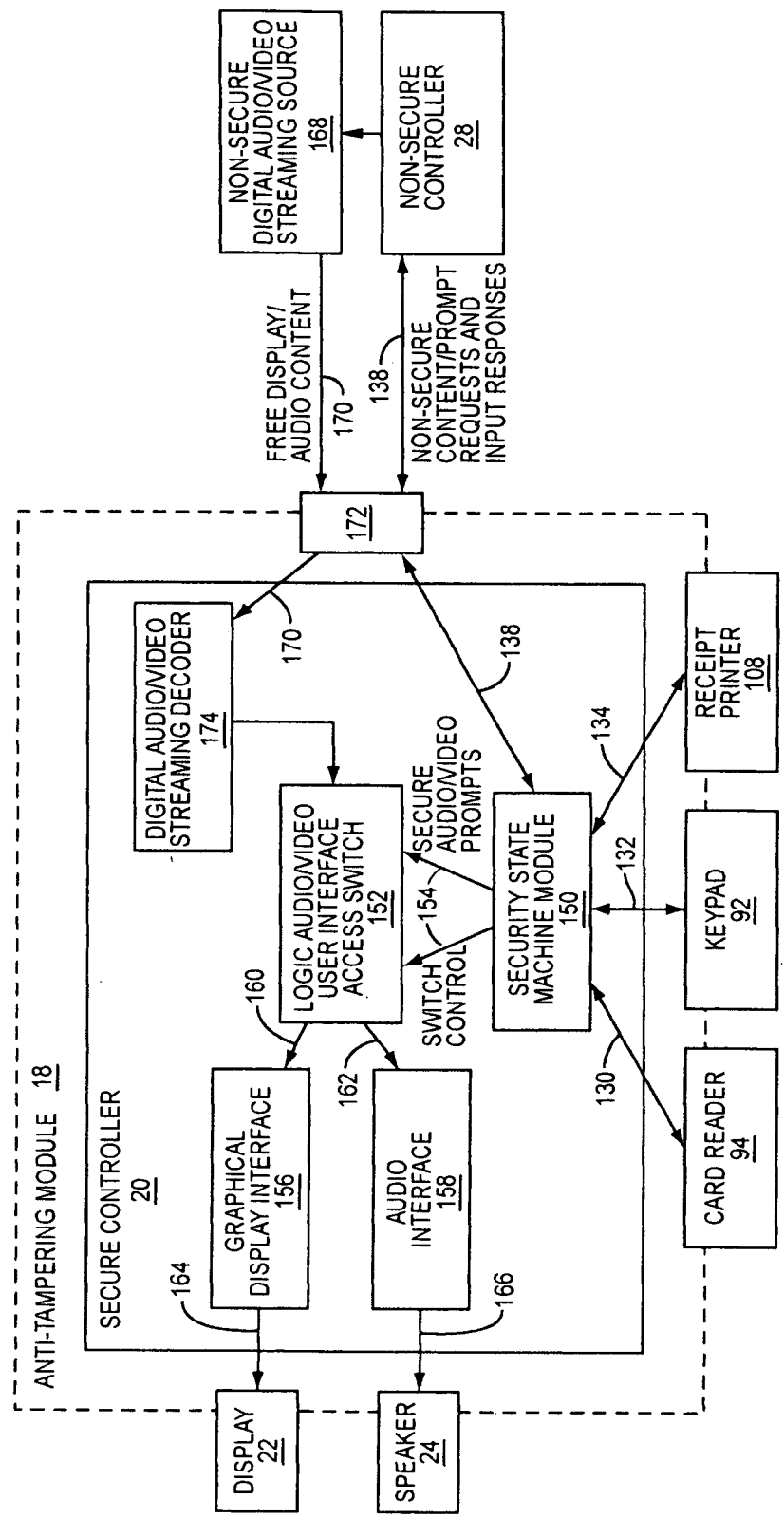
FIG. 9 illustrates a block diagram of an alternative exemplary switching system embodiment which includes a logical switch based within a software application for controlling secure content at a retail device including digital video and audio content and streaming digital video and audio content, according to an embodiment of the subject matter described herein.

As noted above, the user interface access switch may be a logical switch. A logical switch may be implemented within a controller or control system as a software application and may reduce hardware components required to implement the switch. Additionally, a logical switch may provide enhanced capabilities over a physical switch, such as management of streaming content for example. FIG. 9, described below, illustrates an exemplary logical switch embodiment. However, it should be noted that all embodiments may include either a physical or logical switch.

FIG. 9 illustrates a block diagram of an alternative exemplary switching system embodiment which includes a logical switch based within a software application for controlling secure content at a retail device. The secure content may include digital video and audio content, and streaming digital video and audio content. The transmission protocol used may include, for example, transmission control protocol/Internet protocol (TCP/IP), datagram protocols, real-time streaming protocols such as real-time streaming protocol (RTSP), and unicast or multicast types of protocols.

As can be seen from FIG. 9, the anti-tampering module 18 protects input devices, such as the card reader 94 and the keypad 92, and output devices, such as the display 22, the speaker 24, and the receipt printer 108, from tampering. Electrical control signals for these input and output devices are accessible only from within the anti-tampering module 18. Accordingly, a would-be hacker will not have direct access to any control or data signals associated with these input and output devices.

The secure controller 20 interfaces with the card reader 94, the keypad 92, and the receipt printer 108 via respective control/data lines 130, 132, and 134, which are driven by a security state machine module 150. The security state machine module 150 provides interface and control for the secure controller 20.

In this embodiment, the secure controller 20 includes several software components that form a software application that provides a logical switch to manage control of secure and non-secure content. The security state machine module 150 also controls a logic audio/video user interface access switch module 152 via user interface switch control signals 154 to selectively control whether one or more non-secure controllers 28 may drive the display 22 and the speaker 24. Any secure prompts may be provided to the display 22 and the speaker 24 from the security state machine module 150 via the user interface switch control signals 154. Control and data signals for the display 22 and the speaker 24 are passed from the logic audio/video user interface access switch module 152 to a graphical display interface module 156 and an audio interface module 158 via display control/data interface signals 160 and audio control/data interface signals 162, respectively. Physical device data and control signals are passed to the display 22 and the speaker 24 via video data/control lines 164 and audio data/control lines 166, respectively.

Alternatively, should one of the non-secure controllers 28 (only one of which is shown in FIG. 9) desire to provide a prompt to a user on the display 22, that non-secure controller 28 may initiate non-secure content/prompt requests and input responses to the secure controller 20 via a non-secure control system interface 138, as described in association with previous embodiments. When such a request is made, the security state machine module 150 may provide a requested prompt via the user interface switch control signals 154, logic audio/video user interface access switch module 152, and either the graphical display interface module 156 or the audio interface module 158, depending upon whether the prompt is a video prompt or an audio prompt.

When the secure controller 20 is not in a secure mode, for example, when a transaction is not being processed and when the non-secure controller 28 has not requested a prompt from the user, the security state machine module 150 may switch the state of the logic audio/video user interface access switch module 152 via user interface switch control signals 154 to allow one of the non-secure controllers 28 to drive content via a non-secure digital audio/video streaming source 168 over a streaming video/audio link 170 for display on the display 22 and the speaker 24.

This streaming audio/video content is received at an external interface connector 172 at the interface to the anti-tampering module 18. The external interface connector 172 provides physical connectivity for one or more non-secure controllers 28 and non-secure digital audio/video streaming sources 168 from outside the anti-tampering module 18 and may be a network connector for interfacing with networks carrying TCP/IP over Ethernet and may also be an RJ11 or other physical interface connector capable of carrying streaming audio and video signals. As such, one or more non-secure controllers 28 and one or more non-secure digital audio/video streaming sources 168 may be connected to the anti-tampering module 18 via the external interface connector 172.

A digital audio/video streaming decoder module 174 receives data from the non-secure digital audio/video streaming source 168 via the external interface connector 172 and decodes the received content for presentation to the user via the display 22 and/or the speaker 24. The digital audio/video streaming decoder module 174 provides the decoded content to the logic audio/video user interface access switch module 152 for propagation to the display 22 and/or the speaker 24 as described above.

In summary, an exemplary retail payment, advertising, and video and audio switching system and method that controls whether a secure video or audio source or a non-secure video or audio source is allowed to drive a customer video display or audio output, respectively, without compromising security requirements has been described. The system and method prevents the non-secure source from providing unauthorized prompts on the customer output devices to "fake out" the customer and to prevent the non-secure source from eliciting sensitive information which would otherwise be passed "in the clear" and subject to "skimming."

Those skilled in the art will recognize improvements and modifications to the preferred embodiments of the present invention. In addition, it should be understood that aspects of the various embodiments may be interchanged both in whole or in part. All such improvements and modifications are considered within the scope of the concepts disclosed herein and the claims that follow.

What is claimed is:

1. A method of controlling content provided via at least one output device of a fuel dispenser user interface, said method comprising steps of:
   determining, by a first controller, a mode of operation a user interface access switch position is in;
   based on a determination, by the first controller, that the user interface access switch position is not in a first mode of operation, switching the user interface access switch to the first mode of operation that disables access to an output device of a fuel dispenser user interface by a second controller;
   transmitting, by the first controller, an acknowledgement of the first mode of operation to the second controller;
   receiving, by the second controller, the transmitted acknowledgement from the first controller;
   sending, by the first controller, prompts to the output device regarding a first transaction;
   receiving, by the first controller, at least one of card account information and personal identification number (PIN) information from at least one corresponding user input device of the fuel dispenser user interface;
   determining, by signaling received by the first controller, that the first transaction is complete;

based on a determination, by the first controller, that the transaction is complete, switching, by the first controller, said user interface access switch to a second mode of operation that allows access to the output device by the second controller;

determining, by the second controller, that the user access switch is in the second mode of operation;

based on a determination, by the second controller, that the user access switch is in the second mode of operation, sending content associated with the second controller to the output device;

determining, by signaling received by the first controller, that a second transaction has been initiated by a user of the fuel dispenser;

based on a determination, by the first controller, that the second transaction has been initiated by a user of the fuel dispenser, returning said user interface access switch to the first mode of operation.

2. The method of claim 1, wherein the at least one output device includes a display.

3. The method of claim 2, wherein the second content includes streaming video sent to said display in the second mode of operation.

4. The method of claim 1, further comprising the step of determining via the first controller that a transaction has been initiated when the first controller receives signaling indicating that an unsolicited input was received from the user at one of the user input devices.

5. The method of claim 4, further comprising the step of disabling, via the first controller, at least one of the user input devices in response to the unsolicited input via a disable message provided to the user input device.

6. The method of claim 1, further comprising the steps of:
when the user interface access switch is in the second mode of operation, receiving at the first controller an input request from the second controller seeking prompting of user information via at least one of the user input devices; and utilizing the first controller to switch responsively the user interface access switch to the second mode of operation.

7. The method of claim 6, further comprising the step of verifying, by the first controller using a verification process, to authorize the input request received from the second controller.

8. The method of claim 7, further comprising the step of providing, by the first controller, an authorized prompt to the at least one output device when the input request received from the second controller is authorized.

9. The method of claim 8, further comprising the step of receiving, via the first controller, a response to the authorized prompt and providing the response to the second controller.

10. The method of claim 9, further comprising the step of enabling, via the first controller, at least one of the user input devices to encrypt the response to the authorized prompt.

11. The method of claim 1, further comprising the step of, via the first controller, controlling signaling associated with a hardware switching mechanism of the user interface access switch.

12. The method of claim 11, wherein the hardware switching mechanism comprises a multiplexer.

13. The method of claim 12, comprising a module that has an interface connector which provides electrical communication between the user interface access switch and the second controller.

14. The method of claim 1, wherein a source of the second content is contained in a fuel dispenser housing on which the fuel dispenser user interface is located.

15. The method of claim 1, wherein the second controller is a source of the second content.

16. The method of claim 1, wherein the second controller is contained in a fuel dispenser housing but a source of the second content is remote from the fuel dispenser housing.

* * * * *